United States Patent
Zou et al.

(12)

(10) Patent No.: US 11,024,179 B1
(45) Date of Patent: Jun. 1, 2021

(54) DIRECTIONAL BIAS FOR TRAFFIC CONTROL IN SORTATION CENTER

(71) Applicant: Amazon Technologies, Inc., Seattle, WA (US)

(72) Inventors: Le Zou, Cambridge, MA (US); Kevin J. Ma, Nashua, NH (US); Scott C. McLeod, Chelmsford, MA (US); James Plumley, Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 320 days.

(21) Appl. No.: 16/006,091

(22) Filed: Jun. 12, 2018

(51) Int. Cl.
```
G08G 1/00      (2006.01)
G05D 1/02      (2020.01)
G08G 1/01      (2006.01)
G06Q 10/08     (2012.01)
```

(52) U.S. Cl.
CPC .......... *G08G 1/20* (2013.01); *G05D 1/0212* (2013.01); *G05D 1/0291* (2013.01); *G06Q 10/083* (2013.01); *G08G 1/0129* (2013.01); *G08G 1/0145* (2013.01); *G05D 2201/0216* (2013.01)

(58) Field of Classification Search
CPC ...... G08G 1/20; G08G 1/0145; G08G 1/0129; G05D 1/0291; G05D 1/0212; G05D 2201/0216; G06Q 10/083
See application file for complete search history.

(56) References Cited

U.S. PATENT DOCUMENTS

| | | | | |
|---|---|---|---|---|
| 7,327,280 B2 * | 2/2008 | Bachelder | ............. | F41G 9/00 340/902 |
| 8,610,596 B2 * | 12/2013 | Johnson | ............. | G08G 1/097 340/906 |
| 2010/0253836 A1 * | 10/2010 | Huang | ............. | G09G 5/391 348/441 |
| 2010/0317420 A1 * | 12/2010 | Hoffberg | ............. | G07F 17/323 463/1 |
| 2014/0125498 A1 * | 5/2014 | Curry | ............. | G08G 1/087 340/906 |
| 2014/0278029 A1 * | 9/2014 | Tonguz | ............. | G08G 1/087 701/117 |
| 2015/0243165 A1 * | 8/2015 | Elsheemy | ............. | B60R 25/00 340/906 |
| 2017/0110011 A1 * | 4/2017 | Tonguz | ............. | G08G 1/087 |
| 2017/0356596 A1 * | 12/2017 | Frederick | ............. | H03K 17/9502 |
| 2018/0158328 A1 * | 6/2018 | Benhammou | ............. | G08G 1/0125 |
| 2019/0051061 A1 * | 2/2019 | Battles | ............. | G07C 5/008 |
| 2019/0196500 A1 * | 6/2019 | Harasaki | ............. | G05D 1/0268 |

\* cited by examiner

Primary Examiner — Russell Frejd
(74) Attorney, Agent, or Firm — BakerHostetler (57) ABSTRACT

A traffic control system that controls mobile drive unit traffic within a facility by handling requests to traverse intersections based on a priority based in part on an order in which requests are received. For intersections with a directional bias, higher priority is given to requests having a direction of travel that aligns with the directional bias.

20 Claims, 8 Drawing Sheets

DIRECTIONAL BIAS FOR TRAFFIC CONTROL IN SORTATION CENTER

BACKGROUND

The invention relates to robotic devices and methods, and more particularly to controlling traffic of robotic devices within a sort center.

Movement of products in a modern warehouse environment, such as but not limited to a package sort center, in which packages are moved within a facility, occurs on a vast scale. One means to sort packages (i.e., payloads) is to use mobile drive units to deliver packages to destinations designated by the ultimate final destination of the package. For example, mobile drive units can be used to organize packages based on delivery route, as determined based on a postal code or other package features. Mobile drive units are self-powered robotic devices that travel on the floor of the warehouse guided by, for example, fiducial markers in or on the floor. In this manner, mobile drive units may follow a grid-like pattern to traverse from a starting point to a destination point, such as a drop-off location for a package.

When multiple mobile drive units are driving in the same area, or "swarm," traffic congestion occurs. High traffic volume can cause backups. As a result, like at a four-way stop, traffic in a particular direction can backup relative to traffic in a less popular direction.

DETAILED DESCRIPTION OF ILLUSTRATIVE EMBODIMENTS

Figure 1A:
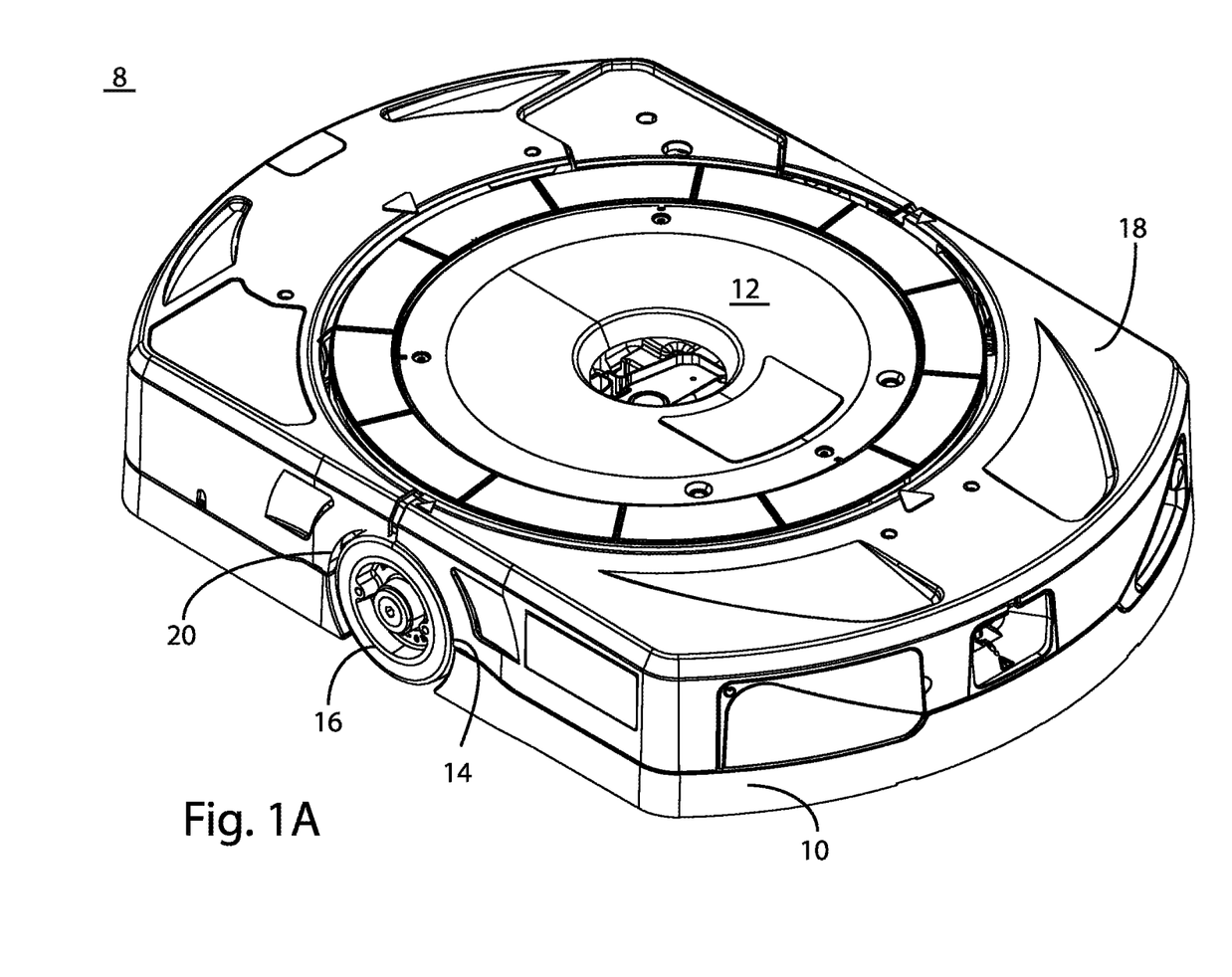
FIG. 1A is a perspective view of a mobile drive unit.
Figure 1B:
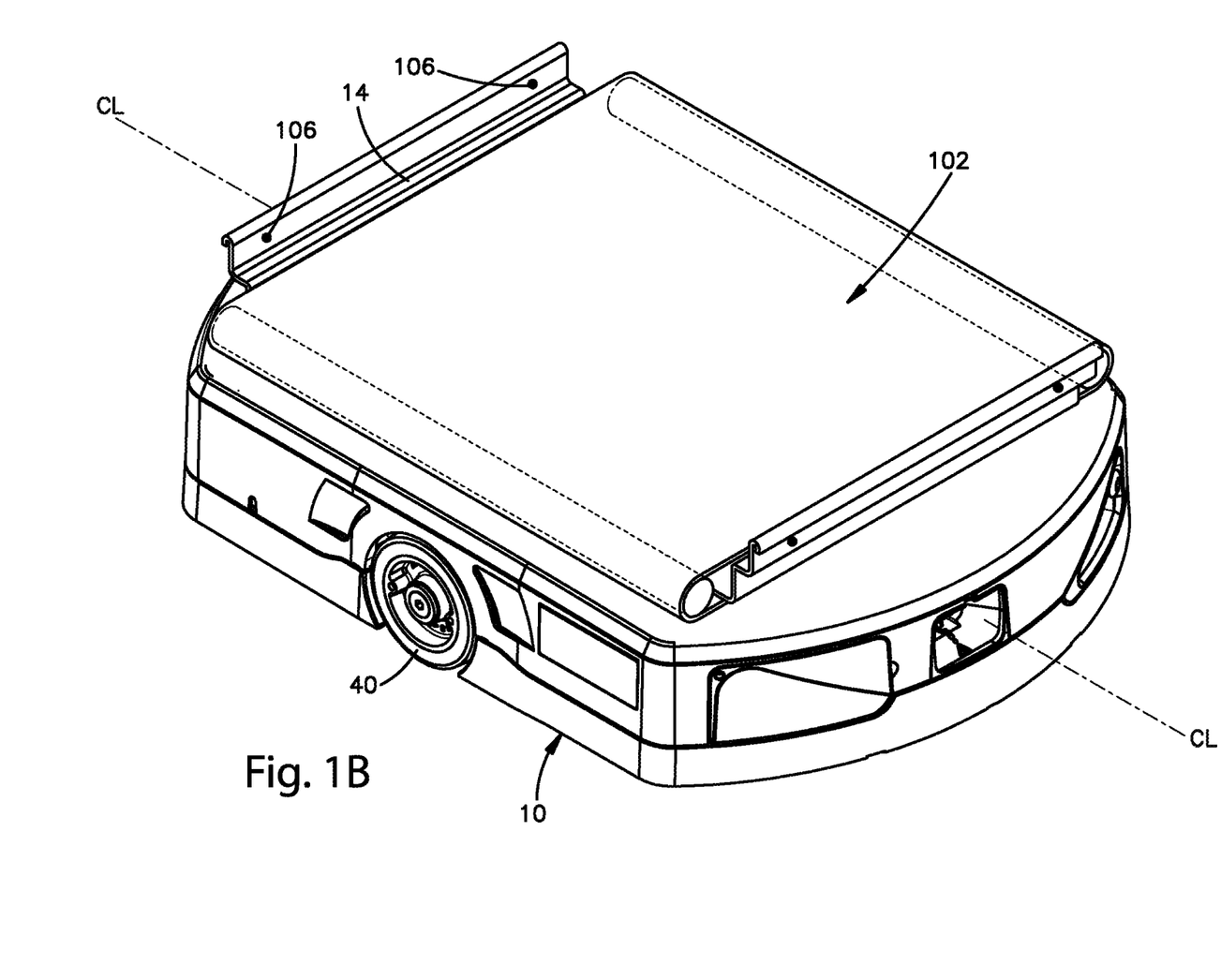
FIG. 1B is a perspective view of a mobile drive unit.

A mobile drive unit ("MDU") 8 includes a chassis assembly 10 of a vehicle, such as an autonomous or semi-autonomous robot, that supports a payload housing 12, capable of carrying a package (or other payload) in a sort center. The term "payload" is used herein to refer to any item typically moved in commerce, including but not limited to items to be packed for delivery, boxes, envelopes (such as jiffy mailers or bubble packs), and the like.

According to the embodiments shown in FIG. 1A, chassis 10 includes a pair of motorized wheel assemblies 14. Each motor assembly 14 includes a conventional motor (as will be understood by persons familiar with mobile drive unit technology) and a drive wheel 16. Wheels 16 are approximately at the midpoint (fore and aft) of mobile drive unit 8. Each wheel 16 may be driven according to control signals to move unit 8 forward or backward, or a direction of one of the wheels 16 can be reversed such that the drive unit 8 can rotate in place. Optionally, chassis also includes one or more casters (not shown).

Mobile drive unit 8 can include a cover 18 that is affixed to chassis 10. Cover 18 may have cut-out portions that form wheel cut-outs for wheels 16 extend through. In this regard, wheels 16 may extend laterally to the outboard sides of mobile drive unit 8.

FIG. 1B illustrates an alternative embodiment of mobile drive unit 8. Instead of (or in addition to) the turntable shown in FIG. 1A, payload housing 12 can include a conveyor system. This system can include a conveyor belt 102 operated through the use of pulleys and/or motors. For example, control of conveyor belt 102 may be based on sensor data from sensors 106 that can be used to detect the presence and/or location of payloads on conveyor belt 102. Optionally, conveyor belt 102 may be sandwiched between sidewalls 14 that can prevent payloads from falling off the side of conveyor belt 102 during transport.

The traffic control technology disclosed herein is not limited to any particular design of mobile drive unit 8. Mobile drive unit 8 includes controllers, cameras and other sensors, a docking port, a turntable, motors to lift and rotate the turntable, and the other components. A person familiar with mobile drive unit technology will understand how to mount and employ the additional components to the chassis disclosed herein according to the particular goals and design of the mobile drive unit application.

For example, mobile drive unit 8 includes a traffic control subsystem 20 communicatively coupled to wheel assemblies 14 for controlling movement of mobile drive unit 8 in such a manner that account for other traffic in the vicinity of mobile drive unit 8. Traffic control subsystem 20 is discussed in more detail with reference to FIG. 2

Figure 2:
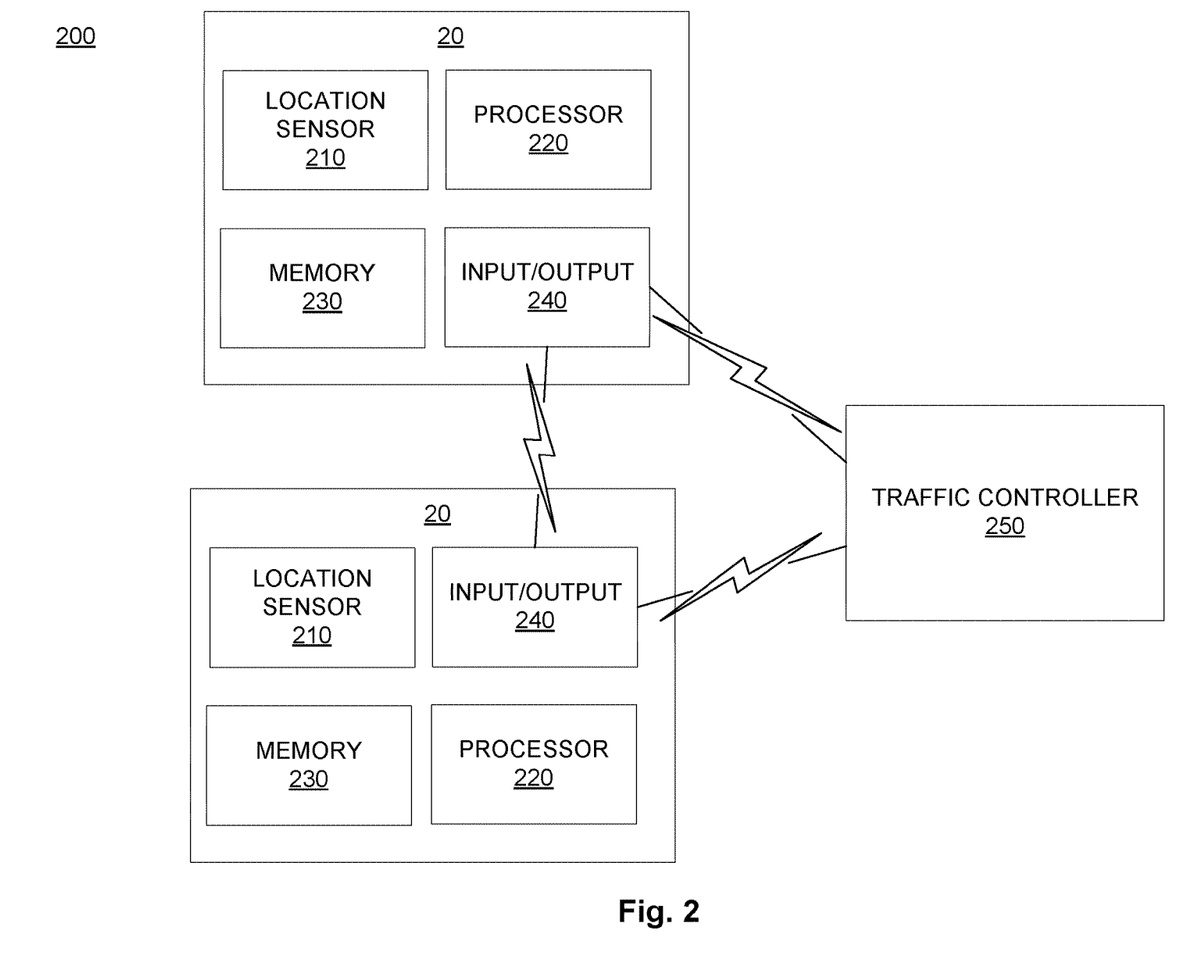
FIG. 2 is a block diagram of a traffic control subsystem of a mobile drive unit and a remote traffic controller.

FIG. 2 illustrates a traffic system 200, including traffic control subsystems 20 (of mobile drive units 8) and an external traffic controller 250, which can communicate with a plurality of traffic control subsystems 20. Further, traffic control subsystems 20 can communicate with one another, either directly or through traffic controller 250 Traffic control subsystem 20 is one subsystem that controls the locomotion of mobile drive unit 8. Traffic control subsystem 20 operates by communicating with traffic controller 250, providing location information of mobile drive unit 8 and receiving traffic information and/or commands from traffic controller 250. For example, traffic controller 250 may provide traffic information to traffic control subsystem 20 so that traffic control subsystem 20 can make locomotion decisions based on traffic in the vicinity of mobile drive unit 8. Additionally or alternatively, traffic controller 250 may provide locomotion commands for traffic control subsystem 20 to execute. Depending on design limitations and processing demands, different implementations may have traffic controller 250 making the locomotion decisions based on traffic data collected from mobile drive unit 8 and other drive units, or may have traffic control subsystem 20 making such decisions based on traffic data transmitted by traffic controller 250. For clarity, when referring to traffic control in general, this disclosure refers to the operations as being performed generally by traffic system 200, which includes the operations being performed by traffic control subsystem 20, traffic controller 250, or any combination thereof.

Traffic control subsystem 20 includes a location sensor 210 for detecting the location of mobile drive unit 8. This may be done in a variety of ways, including one or more indoor positioning techniques. For example, location sensor 210 may detect the presence and identifier of a fiducial within a vicinity of mobile drive unit 8. In one implementation, fiducials may be placed at specific locations on a floor of the sortation center, and location sensor 210 may be positioned to detect or read a fiducial as mobile drive unit 8 drives or stands over that fiducial.

Traffic control subsystem 20 may communicate with other subsystems of mobile drive unit for location purposes, such as acceleration control systems, obstacle avoidance systems, payload monitoring systems, and the like. That is, traffic control subsystem 20 may work with other subsystems to drive mobile drive unit 8.

Location sensor 210 may be communicatively coupled to a processor 220 and a memory 230 of traffic control subsystem 20. Memory 230 stores instructions that causes processor 220 to effectuate operations, which may include operations for driving mobile drive unit 8 and communication (within and outside of mobile drive unit 8). For example, processor 220 may be communicatively coupled to an input/output 240 of traffic control subsystem 20. Input/output 240 may be configured to communicate with traffic controller 250, or other systems.

Figure 3:
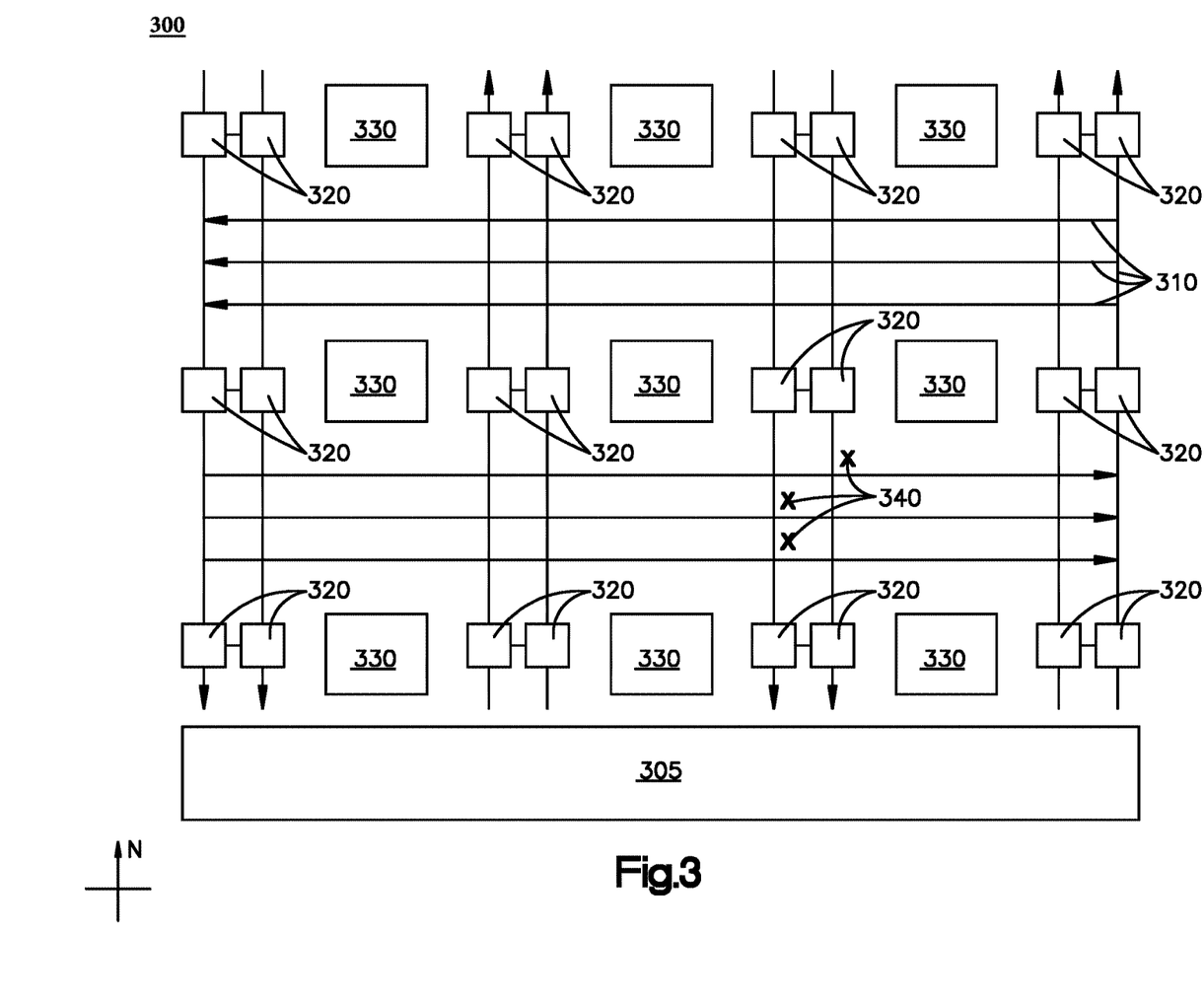
FIG. 3 is a block diagram of an exemplary traffic pattern for mobile drive units in a facility.

FIG. 3 is a floor map 300 of a traffic pattern for mobile drive units 8 in a facility, such as a sortation center. Map 300 includes an induct station 305 from which mobile drive units 8 enter a plurality of travel lanes 310 along which mobile drive units 8 can travel. Induce station 305 may include, or may be a waypoint for, mobile drive units 8 to enter travel lanes 310 after recharging, being loaded with a payload to be delivered to a particular ejection point, or the like. For example, mobile drive units 8 may begin and end each delivery at induct station 305. While map 300 includes a single induct station 305, other configurations, including those with multiple induct stations 305 are contemplated.

As map 300 illustrates, travel lanes 310 include perpendicular, intersecting lanes 310, as well as series of parallel lanes 310. This allows mobile drive units 8 to reach different ejection points 320 by traveling in straight lines and, optionally, making 90 degree turns. Ejection points 320 are strategically positioned alongside chutes 330, into which mobile drive units 8 can eject or unload their payloads. While map 300 shows only induct station 305, (parallel and perpendicular) travel lanes 310, ejection points 320, and chutes 330, a more complete map of a facility may include other configurations and other elements, including obstacles, mobile drive unit loading mechanisms, or the like. That is, a configuration of a facility is not limited to what is shown in floor map 300. Fiducials may be spaced along travel lanes 310. For example, each intersection of any two travel lanes 310 may be marked by a fiducial 340, illustrated by exemplary "X" at sample intersections.

While travel lanes 310 are all straight lanes, and every intersection is comprised of two straight lanes 310 intersecting at 90 degrees, implementation of this technology is not limited to this particular map 300. For example, other maps 300 can incorporate different path arrangements, including but not limited to curved lanes 310, intersections having different angles, and intersections having different number of lanes 310 intersecting. Further, traffic lanes 310 are shown as all existing in the same plane. However, it is contemplated that this technology may be used to control traffic traveling across nonplanar surfaces and even three-dimensional travel.

Ideally, traffic across map 300 would always be evenly dispersed, to minimize traffic jams or backlogs. However, in practice, certain intersections are at risk of traffic jams. Traffic jams can be predictable, such as those congregating around where mobile drive units 8 are traveling along commonly used routes or portions thereof, such as travel lanes 310 entering induct station 305. Additionally or alternatively, traffic jams may arise dynamically, such as in response to a mechanical failure of a mobile drive unit 8 blocking a portion of a travel lane 310.

Traffic system 200 may use different mechanisms, like route planning that spaces used routes across map 300, to minimize traffic jams. Additionally or alternatively, traffic system 200 may include the use of directional bias policies to control traffic in response to historical and dynamic traffic congestion in a particular direction.

As a default, traffic system 200 may respond to travel requests for a given intersection based on an order in which those requests are received. In other circumstances, other factors—in addition to or instead of the order in which the travel requests are received—may alter the order in which travel requests are processed or responded to. The priority of a request may be based on a combination of factors related to other traffic or the specific MDU 8 making the request. The priority of a particular request may be affected by an impending deadline for a payload of MDU 8. For example if a delivery truck is waiting on the package MDU 8 is delivering to ejection point 320, particularly if that delivery truck is late or otherwise behind schedule, then travel requests from MDU 8 can be assigned higher priority. As another example, if MDU 8 is suffering from mechanical issues, has a low battery, or is otherwise at risk of imminently breaking down, requests from that MDU 8 made on its route back to induct station 305 to receive repairs or charging can be assigned higher priority. Requests from MDUs 8 entering the intersection from other traffic-congested areas may have higher priority.

Figure 4:
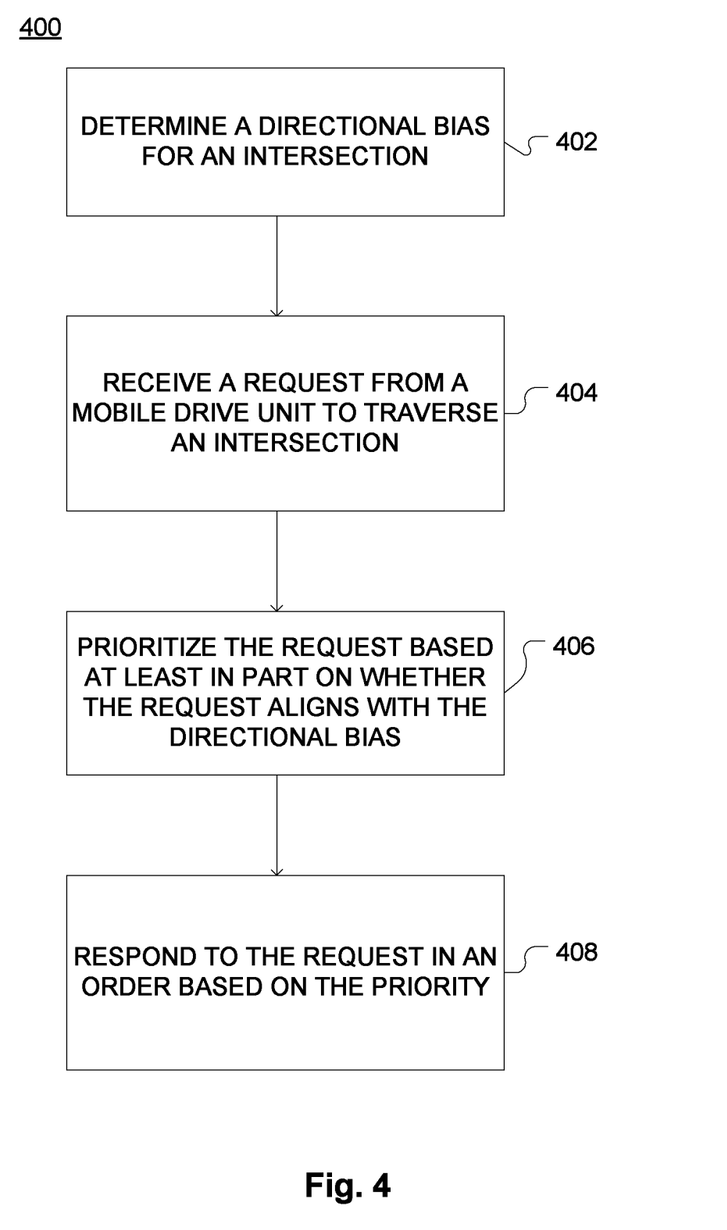
FIG. 4 is a flowchart of an exemplary method of handling traffic requests to traverse an intersection having a directional priority.

FIG. 4 illustrates an exemplary method 400 for managing traffic at an intersection using directional bias. At a high level, method 400 includes determining a directional bias for an intersection, prioritizing requests to intersect the intersection from mobile drive units 8 traveling along the directional bias, and granting requests based at least in part on the priority associated with the travel requests. In this manner, traffic system 200 can handle different intersections differently based on their unique traffic congestion levels.

In some embodiments, controlling traffic for a facility may include creating traffic control policies that encompass every intersection. However, in other circumstances, traffic may be controlled by creating traffic control policies for less than all of the intersections. For example, for infrequently travelled intersections, a travel bias may not be necessary to prevent or decrease traffic congestion in a particular direction.

At step 402, method 400 includes determining a directional bias for an intersection. A directional bias may be given to the direction (e.g. east-to-west or north-to-south) based on traffic congestion at that intersection. For example, if historical traffic patterns suggest that it is likely that east-west traffic is more prevalent at the intersection—either as a general matter, based on time of day, or based on other factors—then directional bias may be given to the east-west direction. As another example, if current traffic patterns indicate that traffic is backing up in the east-west direction, as opposed to the north-south direction, then this could also weigh in favor of granting directional bias to the east-west direction. As yet another example, if traffic past the intersection (e.g., north-south traffic that is south of the intersection) is backed up, then directional bias may be given to the east-west traffic, since granting priority to the north-south traffic would not disperse traffic, as north-south traffic could not get past the backup.

Selecting a directional bias for an intersection can take into account other traffic in map 300, not limited to that particular intersection. For example, if there is more traffic traveling east-west (or west-east) than there is traffic traveling north-south (or south-north), than the directional bias for that intersection may be selected to be east-west (or west-east, if the direction of travel of that travel lane 310 is west-east), rather than north-south or south-north.

Selecting a directional bias for an intersection can be a dynamic, ongoing process. For example, as the east-west traffic waiting to traverse the intersection decreases, traffic can build up in the north-south direction. Thus, traffic system 200 may reevaluate traffic near a given intersection to adjust the bias based on current traffic conditions. Additionally or alternatively, the directional bias may change based on the repeat of historical conditions. For example, historical patterns may suggest that traffic is more congested in the north-south lane 310 than an intersecting east-west lane 310 at a certain time of day, such as towards the end of a shift, in the time leading up to the departure of full delivery trucks, or other circumstances. Correlations between intersections may also inform directional bias of an intersection. For example, traffic congestion on an east-west lane 310 at a first intersection may suggest future traffic congestion on an intersecting north-south lane 310 at a second intersection. Thus, directional bias of the first intersection may grant higher priority to mobile drive units 8 traveling west, while the directional bias of the second intersection may grant higher priority to mobile drive units 8 traveling south.

Just as selecting a directional bias can be dynamic, whether an intersection has a directional bias or not can also change. For example, the priority of travel requests for a given intersection may not be affected by what direction mobile drive unit 8 is seeking to travel.

At step 404, method 400 may include receiving a request from mobile drive unit 8 seeking to travel the intersection that has a directional bias. The request may indicate a direction of travel through the intersection (e.g., east-west, north-south, or a turn).

Step 406 includes prioritizing the request among other pending requests to traverse the intersection based on the direction of travel of the request. If the request is to travel in a direction that aligns with the directional bias of the intersection, the request has a higher priority. For example, the request to travel east-west through an intersection that has a north-south directional bias at the time the request is prioritized will have a lower priority than if the request had been to travel north-south.

How a turn is handled in light of the directional bias can depend upon the particular implementation of traffic system 200 or how a particular directional bias is defined. In some implementations, a directional bias may focus more on which direction mobile drive unit 8 will travel as it exits the intersection. Thus, a request to turn left to switch the direction of travel from north-south to east-west, so that mobile drive unit 8 will be traveling west upon exiting the intersection may be prioritized based on the directional bias of the intersection being east-west. In some implementations, a directional bias may focus more on which direction mobile drive unit 8 will have traveled as it enters the intersection. Thus, a request to turn left to switch the direction of travel from north-south to east-west may have a lower priority based on the directional bias of the intersection being east-west. In some implementations, no priority may be assigned to requests to turn in the intersection. Any combination of the foregoing method of prioritizing turns may be implemented in a single traffic system 200.

The use of directional bias does not preclude granting or delaying a travel request based on whether the path in the requested direction is clear. Rather, priority simply affects in what order multiple requests are addressed. For example, multiple requests may be answered in an order that is based at least in part on the receipt order. The directional bias may affect this order. For example, the order in which requests are answered may include a first subset of the plurality of requests that are requesting to travel along the directional bias, and then answer a second subset of the plurality of requests that are requesting to travel in another direction besides the directional bias, regardless of the order in which those requests were originally received. Answering the requests in this order may cause the mobile drive units to traverse the section in the same order.

The order in which requests are answered may be based on other criteria, in addition to or instead of order of receipt and directional bias. For example, certain requests may be marked as urgent, such as in instances where the delivery associated with that payload is behind schedule or imminent. As another example, delivery for payloads in which a faster delivery time is scheduled, like next-day delivery, may be prioritized. Such urgent criteria may be part of the delivery priority associated with the request.

Figure 5:
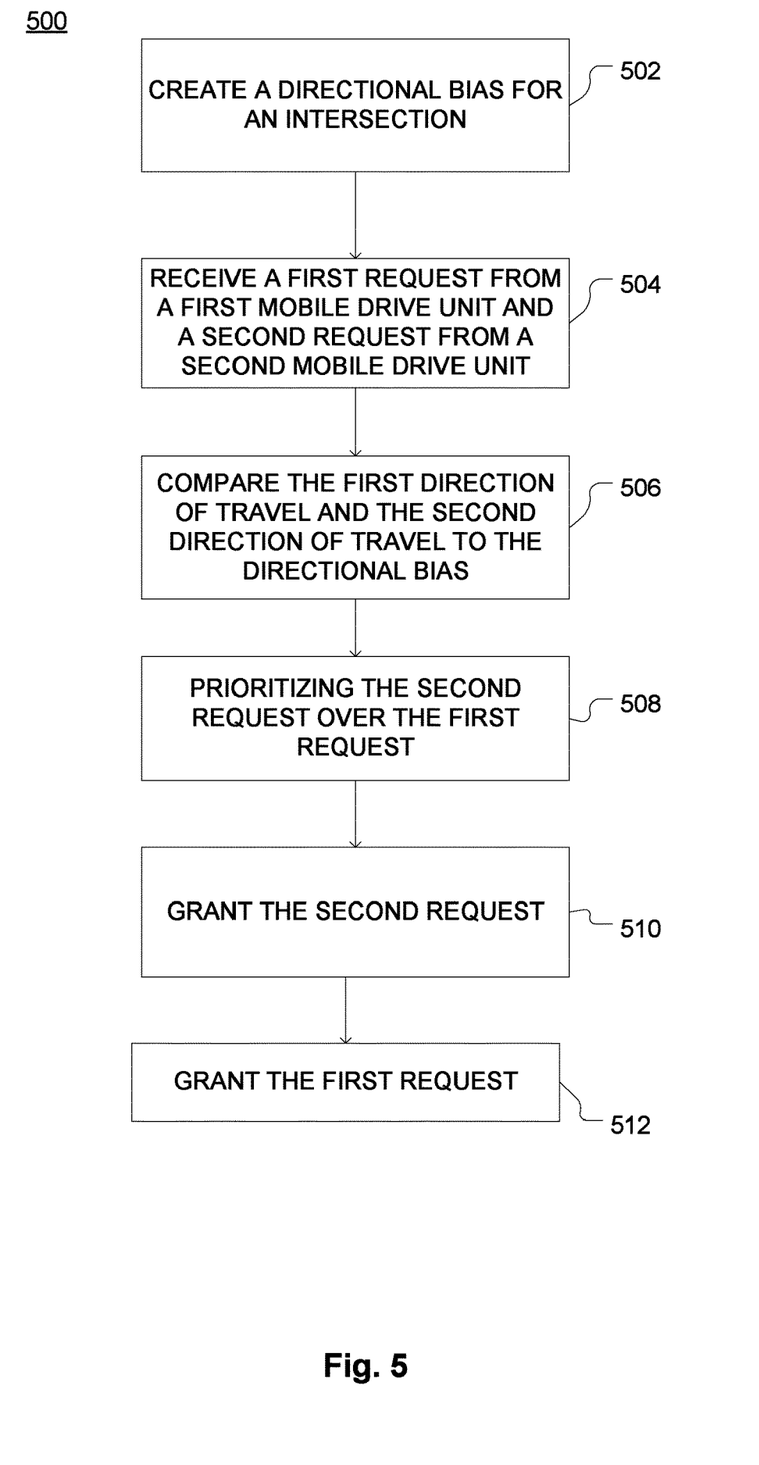
FIG. 5 is a flowchart of an exemplary method of handling traffic requests to traverse an intersection having a directional priority.

FIG. 5 illustrates an exemplary method 500 for managing traffic at an intersection using directional bias. At a high level, method 500 includes creating a directional bias for an intersection, prioritizing requests to intersect the intersection from mobile drive units 8 traveling along the directional bias, and granting requests based at least in part on the priority associated with the travel requests. As shown in FIG. 5, this prioritizing may result in granting later-received requests before granting earlier-received requests.

At step 502, method 500 includes creating a directional bias for an intersection. Different factors may affect the directional bias for the intersection, including historical traffic patterns in a vicinity of the intersection. For example, if traffic in that vicinity tends to back up in the north-south direction, the directional bias may favor north-south traffic over east-west traffic. Another factor is current traffic conditions at the intersection. This factor operates similarly to the historical traffic patterns, except that it allows traffic system 200 to respond in real-time or near-real-time to current conditions.

Creating a directional bias for the intersection may be done regularly, so that traffic system 200 can respond to and account for changes in traffic at the intersection.

At step 504, method 500 may include receiving a first request from a first mobile drive unit 8 to traverse the intersection in a first direction and a second request from a second mobile drive unit 8 to traverse the intersection in a second direction. First direction may include a starting direction in which first MDU 8 will enter the intersection and/or an ending direction in which first MDU 8 will exit the intersection. (In cases in which first MDU 8 is requesting to travel straight through the intersection, the starting direction and ending direction will be the same.) Second direction may include a starting direction in which second MDU 8 will enter the intersection and/or an ending direction in which second MDU 8 will exit the intersection. (In cases in which second MDU 8 is requesting to travel straight through the intersection, the starting direction and ending direction will be the same.)

The first request and the second request may be received by traffic system 200 as part of a single batch, or they may be received individually. Regardless, the request time—the time at which MDU 8 actually made the request, which may be different than the time at which traffic system 200 receives, or first evaluates the request—may establish the default order in which the requests are processed. For purposes of the example set forth in FIG. 5, the first request may have an earlier request time than the second request. However, as subsequent steps illustrate, the order in which method 500 answers these requests differs—illustrating the practical effect of the directional bias.

At step 506, method 500 includes comparing the first direction to the directional bias and the second direction to the directional bias to see whether the first request and/or the second request align with the directional bias. For example, if first request is to enter the intersection traveling north and turn right in the intersection, and the second request is to travel north through the intersection, the second request may align with the directional bias to exit the intersection traveling north.

At step 508, based on the second direction of travel aligning with the directional bias (and the first direction of travel not aligning with the directional bias), the second request may be prioritized over the first request.

At step 510, based on the second request having a higher priority, method 500 may include answering the second request. This may include, for example, granting the second request, which in turn may cause second MDU 8 to traverse the intersection traveling north, in accordance with the second request.

At step 512, after second MDU 8 has traversed the intersection, method 500 may include answering the first request. This may cause the first MDU 8 to traverse the intersection.

As a goal of the directional bias is to decrease traffic buildup, other considerations may factor into the order in which requests are granted. For example, if, prior to receiving the first request and the second request, traffic system 200 had first received a request from a third MDU 8 to traverse the same intersection, and no other requests to traverse the intersection were pending, then it would be desirable to answer that request now, regardless of the direction in which third MDU 8 is requesting to travel. For example, if third MDU 8 had a third direction of travel that did not align with the directional bias of the intersection, it would still be advantageous to first allow third MDU 8 to traverse the intersection (assuming the intersection was clear) without needing to wait to receive a higher priority request.

Figure 6:
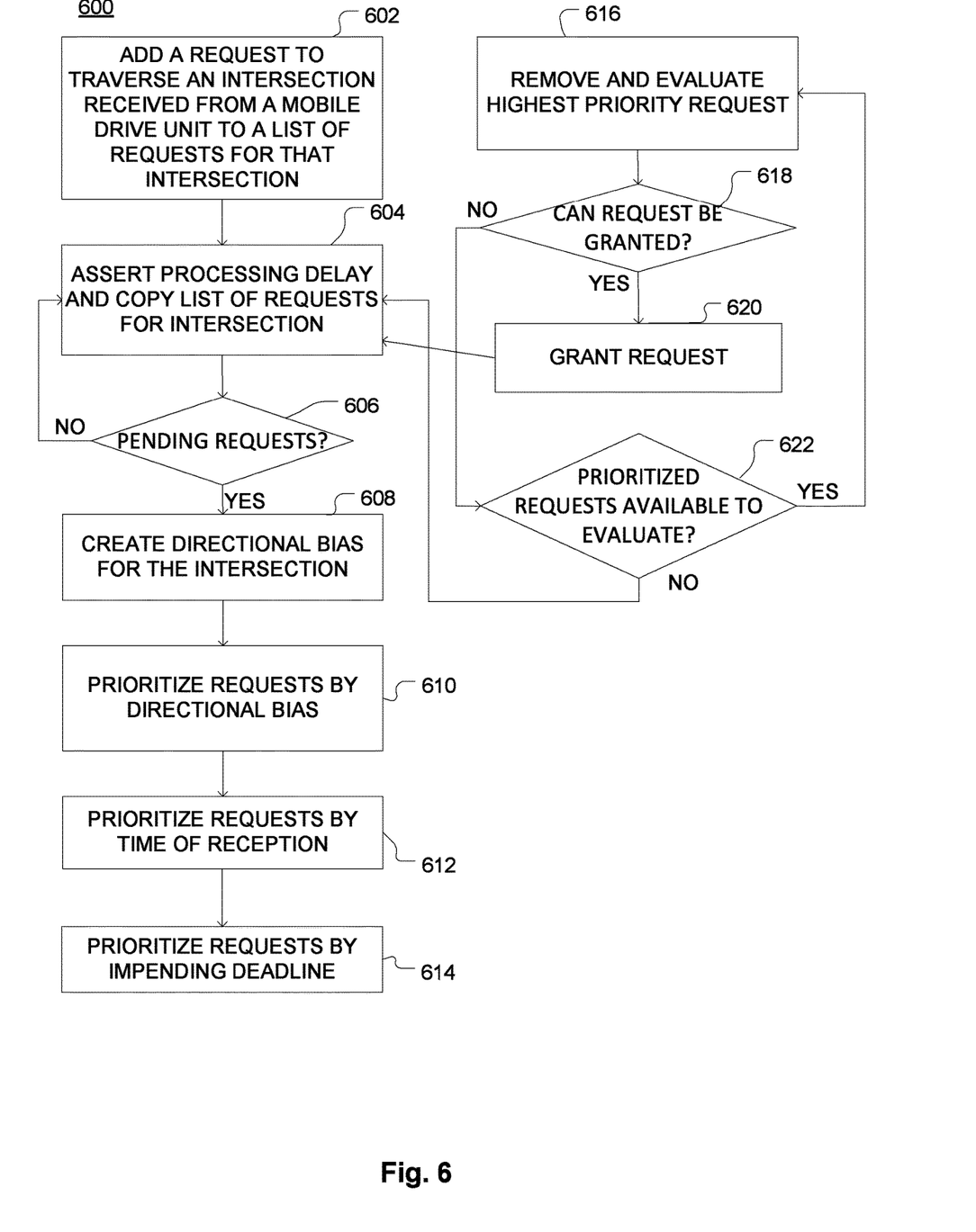
FIG. 6 is a flowchart of an exemplary method of handing traffic requests to traverse an intersection having a directional priority.

FIG. 6 is a flowchart of exemplary method 600 for managing traffic at an intersection using directional bias. At a high level, method 600 includes compiling requests to traverse an intersection, creating a directional bias for that intersection, prioritizing requests to intersect the intersection from mobile drive units 8 traveling along the directional bias, further prioritizing the requests based on request time, further prioritizing requests by impending deadlines, then considering (and possibly granting) request in order based on the priority.

At step 602, method 600 includes asynchronously receiving requests to traverse an intersection from a plurality of mobile drive units 8. Each request is categorized by intersection and a list of outstanding requests is maintained on a per intersection basis.

At step 604, method 500 includes asynchronously processing requests to traverse an intersection from a plurality of mobile drive units 8 by periodically checking the list of outstanding requests for a given intersection. After a configurable delay, a copy of the current list of outstanding requests is made and processing continues to step 606 where a check is performed to see if there are any outstanding requests for the given intersection. If there are no outstanding requests, processing returns to step 604 to await the next batch processing for the given intersection. If there are outstanding requests, processing continues to step 608.

At step 608, method 600 includes creating a directional bias for an intersection, as discussed above with respect to FIG. 5. Creating a directional bias for the intersection may be re-evaluated for each batch processing, so that traffic system 200 can respond to and account for changes in traffic at the intersection.

At step 610, method 600 applies an initial prioritization based on the directional bias to the list copy. The direction of each request is extracted from the request. As discussed above, the direction of the request may be based on the direction from which the MDU 8 will enter the intersection, the direction in which MDU 8 will exit the intersection, or a combination thereof (In cases where the MDU 8 is requesting to travel straight through the intersection, the starting direction and ending direction will be the same.) Prioritizing the requests based on the direction associated with each direction may include prioritizing those requests having a direction that matches the directional bias. As another example, the prioritizing may be based on a plurality of ranked directions, so that requests that align with the highest prioritized directional bias are ranked highest, and the subsequent ordering of the priority is based on the relative ranking of other directional priorities.

At step 612, method 600 applies a secondary prioritization based on the request time associated with the requests in the list copy. Each request for a given direction may be ordered by time of reception. As a goal of the directional bias is to decrease traffic buildup, other considerations may factor into the order in which requests are granted. For example, if an MDU 8 had a direction of travel that does not align with the directional bias of the intersection and no other MDU 8 was requesting travel through that intersection aligned with the directional bias, it would still be advantageous to allow that MDU 8 to traverse the intersection (assuming the intersection was clear) without needing to wait to receive a higher priority request. Thus, the resulting prioritized order would be based on both the directional bias (as applicable) and by the request time.

At step 614, method 600 applies a tertiary prioritization based on other impending deadlines. As a goal of the directional bias is to decrease traffic buildup, other considerations may factor into the order in which requests are granted. For example, an MDU 8 had a direction of travel that did not align with the directional bias of the intersection but that MDU 8 had a payload whose delivery was late, it might still be advantageous to allow that MDU 8 to traverse the intersection (assuming the intersection was clear) without needing to wait to receive a higher priority request, regardless of when the request was received or the direction of travel requested. Thus, the resulting prioritized order would be based on directional bias (as applicable), the request time, and impending deadlines (as applicable).

At step 616, once the list copy has been prioritized, the highest priority request is removed from the list copy. At step 618, the request is further evaluated to determine if the request can be granted. For example, a request may be granted if the intersection is clear, if the space beyond the intersection is clear, if no obstructions block the path through the intersection, or any combination thereof.

At step 620, the request is granted, if the requirements evaluated at step 618 are satisfied. Then the method continues back to step 604 to await the next batch processing.

After step 618 (if the request cannot be granted), method 600 proceeds to step 622 in which method 600 determines whether any requests remain in the list copy. If the list contains additional prioritized requests, processing continues back to step 616 to process the next prioritized request, repeating steps 618-622 as appropriate; if the list is empty, processing continues back to step 604 to await the next batch processing.

Figure 7:
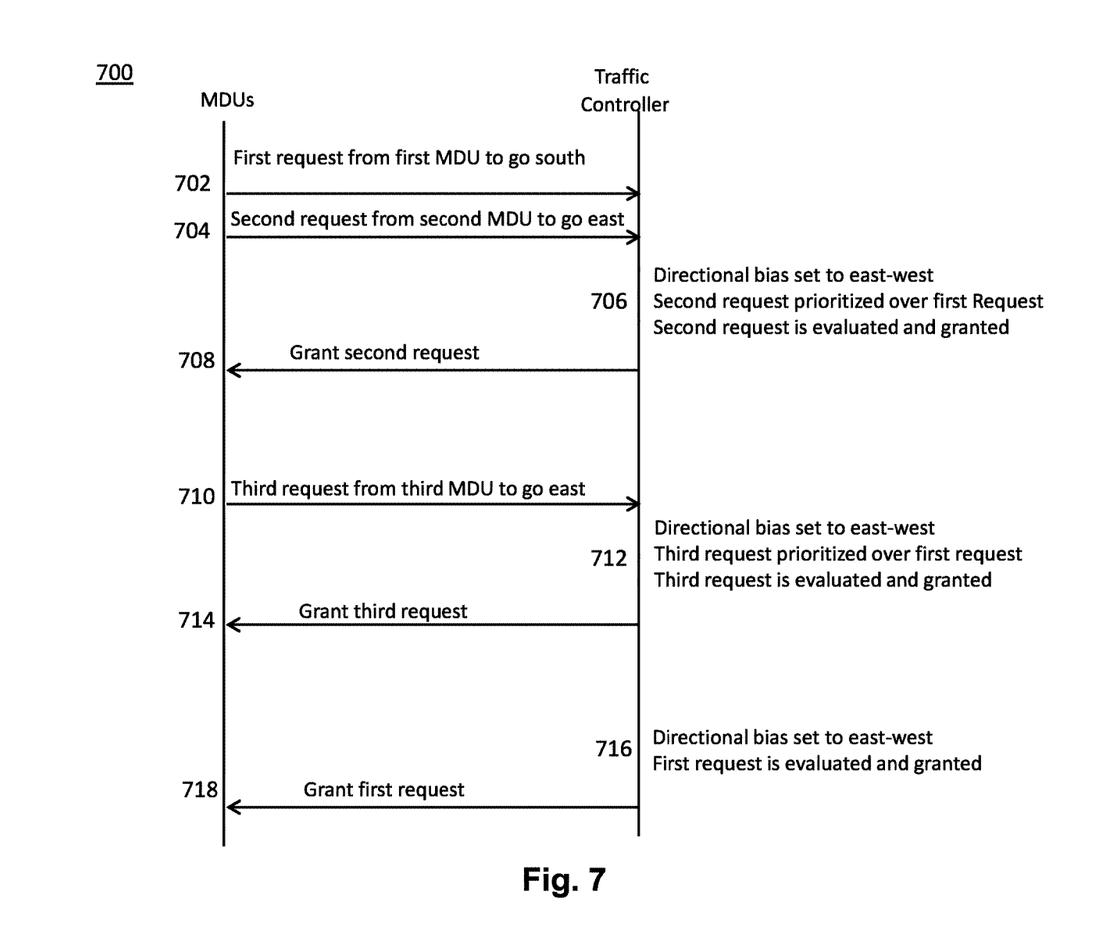
FIG. 7 is a sequence diagram of an exemplary handling of traffic requests to traverse an intersection having a directional priority.

FIG. 7 illustrates an exemplary iteration through the method 600 for managing traffic at an intersection using directional bias. At a high level, sequence 700 includes accepting requests from mobile drive units 8, creating a directional bias for an intersection, prioritizing requests to intersect the intersection from mobile drive units 8 traveling along the directional bias, and granting requests based at least in part on the priority associated with the travel requests. As shown in FIG. 7, this prioritizing may result in granting later-received requests before granting earlier-received requests.

At step 702, sequence 700 may include receiving a first request from a first mobile drive unit 8 to traverse the intersection in a first direction (e.g., south). At step 704, sequence 600 may include receiving a second request from a second mobile drive unit 8 to traverse the intersection in a second direction (e.g., East).

At step 706, a periodic batch processing is performed on the available list of requests (e.g., the first and second requests). A directional bias is determined (e.g., east), and a prioritization based on the on that directional bias is applied (e.g., the second request, which is aligned with the directional bias, is prioritized over the first request, which is not aligned with the directional bias). At step 708, the highest priority request (e.g., the second request) is evaluated and granted, based on the intersection being clear.

At step 710, sequence 700 may include receiving a third request from a third mobile drive unit 8 to traverse the intersection in a third direction (e.g., east). At step 712, a next periodic batch processing is performed on the available list of requests (e.g., the first and third requests). A directional bias is determined (e.g., east), and a prioritization based on the on that directional bias is applied (e.g., the third request, which is aligned with the directional bias, is prioritized over the first request, which is not aligned with the directional bias). At step 714, the highest priority request (e.g., the third request) is evaluated and granted, based on the intersection being clear.

At step 716, a next periodic batch processing is performed on the available list of requests (e.g., the first request). A directional bias is determined (e.g., east), and a prioritization based on the on that directional bias is applied. Because the first request is the only request being evaluated, there are no requests aligned with the directional bias to be prioritized over the first request. At step 718, the highest priority request (e.g., the first request) is evaluated and assuming the intersection is clear is granted. Thus, sequence 700 illustrates an exemplary application of method 600 in which requests may be evaluated in an order that is altered based on the directional bias.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A traffic system for controlling traffic of a plurality of mobile drive units including a first mobile drive unit, a second mobile drive unit, and a third mobile drive unit, the traffic system comprising:
   a controller communicatively coupled to the plurality of mobile drive units;
   memory storing instructions that cause the controller to effectuate operations, the operations comprising:
      creating a directional bias for an intersection based at least in part on traffic congestion;
      receiving, from the first mobile drive unit, a first request to traverse the intersection, the first request indicating a first direction of travel of the first mobile drive unit;
      causing the first mobile drive unit to traverse the intersection by granting the first request;
      subsequent to granting the first request, receiving, from the second mobile drive unit, a second request to traverse the intersection, the second request indicating a second direction of travel of the second mobile drive unit;
      subsequent to receiving the second request, receiving, from the third mobile drive unit, a third request to traverse the intersection, the third request indicating a third direction of travel of the third mobile drive unit;
      comparing the second direction of travel with the directional bias;
      comparing the third direction of travel with the directional bias;
      based on the third direction of travel aligning with the directional bias and the second direction of travel not aligning with the directional bias, prioritizing the third request over the second request;
      causing the third mobile drive unit to traverse the intersection by granting the third request; and
      subsequent to the third mobile drive unit traversing the intersection, granting the second request.

2. The traffic system of claim 1, wherein the directional bias comprises exiting the intersection traveling west.

3. The traffic system of claim 2, wherein the third request is to traverse the intersection traveling east-west.

4. The traffic system of claim 2, wherein the third request is to turn within the intersection to exit the intersection traveling west.

5. The traffic system of claim 1, wherein the directional bias comprises entering the intersection traveling west.

6. The traffic system of claim 5, wherein the third request is to traverse the intersection traveling east-west.

7. The traffic system of claim 5, wherein the third request is to enter the intersection traveling west and turning within the intersection.

8. A traffic system comprising:
   a controller;
   memory storing instructions that cause the controller to effectuate operations, the operations comprising:

creating a directional bias for an intersection;
receiving, from a first mobile drive unit, a first request to traverse the intersection, the first request indicating a first direction of travel of the first mobile drive unit and, from a second mobile drive unit, a second request to traverse the intersection, the second request indicating a second direction of travel of the second mobile drive unit,
wherein a request time of the first request is earlier than a request time of the second request;
comparing the first direction of travel and the second direction of travel with the directional bias;
based on the second direction of travel aligning with the directional bias and the first direction of travel not aligning with the directional bias, prioritizing the second request over the first request;
causing the second mobile drive unit to traverse the intersection by granting the second request; and
subsequent to the second mobile drive unit traversing the intersection, granting the first request.

9. The traffic system of claim 8, wherein the directional bias is based at least on traffic congestion in a vicinity of the intersection.

10. The traffic system of claim 8, wherein the directional bias is based at least on historical traffic patterns in a vicinity of the intersection.

11. The traffic system of claim 8, wherein the directional bias comprises a direction leaving the intersection.

12. The traffic system of claim 8, wherein the directional bias comprises a direction entering the intersection.

13. The traffic system of claim 8, the operations further comprising:
subsequent to receiving the second request, receiving, from a third mobile drive unit, a third request to traverse the intersection;
prioritizing the third request over the second request based on an urgency regarding a delivery by the third mobile drive unit; and
causing the third mobile drive unit to traverse the intersection by granting the third request prior to granting the second request.

14. A method comprising:
receiving, in a receipt order, a plurality of requests to traverse an intersection from a plurality of mobile drive units;
for each request of the plurality of requests, determining whether to assign a directional priority to the request based on whether a direction of travel indicated by the request aligns with a directional bias of the intersection;
ordering the plurality of requests based at least on the receipt order and on the directional priorities; and
answering each of the plurality of requests in a desired order based on the ordering.

15. The method of claim 14, wherein the directional bias comprises exiting the intersection in a preferred direction.

16. The method of claim 14, wherein the directional bias comprises entering the intersection from a preferred direction.

17. The method of claim 14, wherein the desired order is further based on a delivery priority associated with at least one request of the plurality of requests.

18. The method of claim 14, wherein the desired order comprises a first subset of the plurality of requests requesting to travel along the directional bias followed by a second subset of the plurality of requests requesting to travel in one or more directions other than the directional bias.

19. The method of claim 14, wherein answering each of the plurality of requests causes the mobile drive units associated with the requests to traverse the intersection in the desired order.

20. The method of claim 14, further comprising changing the directional bias for the intersection based on a change in traffic.

* * * * *